(12) United States Patent
Winter et al.

(10) Patent No.: US 10,873,496 B1
(45) Date of Patent: Dec. 22, 2020

(54) APPARATUSES, SYSTEMS, AND METHODS FOR LINK STATUS DETECTION AND REMEDIATION OF NETWORK ATTACHED DEVICES

(71) Applicant: Facebook, Inc., Menlo Park, CA (US)

(72) Inventors: Howard William Winter, Romsey (GB); Peter John Richard Gilbert Bracewell, Isleworth (GB); Michael Christopher Van der Westhuizen, Horsham (GB)

(73) Assignee: Facebook, Inc., Menlo Park, CA (US)

( * ) Notice: Subject to any disclaimer, the term of this patent is extended or adjusted under 35 U.S.C. 154(b) by 149 days.

(21) Appl. No.: 16/126,367

(22) Filed: Sep. 10, 2018

(51) Int. Cl.
 G06F 15/173 (2006.01)
 H04L 12/24 (2006.01)
 G06F 9/4401 (2018.01)
 H04L 12/26 (2006.01)

(52) U.S. Cl.
 CPC ........ H04L 41/0654 (2013.01); G06F 9/4403 (2013.01); H04L 43/0811 (2013.01)

(58) Field of Classification Search
 CPC . H04L 41/0654; H04L 43/0811; G06F 9/4403
 USPC .......................................................... 709/224
 See application file for complete search history.

(56) References Cited

U.S. PATENT DOCUMENTS

| 5,376,922 A * | 12/1994 | Kiss | G08B 26/007 340/10.41 |
| 7,062,177 B1 * | 6/2006 | Grivna | H04B 10/2581 398/16 |
| 7,996,594 B2 * | 8/2011 | Abdul | H04L 69/40 710/260 |
| 2005/0271064 A1 * | 12/2005 | Chang | H04L 69/14 370/397 |
| 2009/0185565 A1 * | 7/2009 | Diab | H04L 12/40039 370/394 |
| 2010/0241882 A1 * | 9/2010 | Diab | H04L 12/10 713/320 |
| 2011/0022923 A1 * | 1/2011 | Diab | G06F 11/10 714/752 |
| 2011/0305246 A1 * | 12/2011 | Diab | H04L 12/4625 370/458 |
| 2013/0295909 A1 * | 11/2013 | Couch | H04L 41/12 455/419 |
| 2014/0192636 A1 * | 7/2014 | Bao | H04L 41/0654 370/225 |
| 2014/0292582 A1 * | 10/2014 | Ware | H05K 7/1498 342/450 |
| 2014/0351484 A1 * | 11/2014 | Freking | G06F 13/4022 710/314 |
| 2014/0362729 A1 * | 12/2014 | Michaud | H04W 16/26 370/254 |
| 2015/0117177 A1 * | 4/2015 | Ganga | H04L 1/1621 370/216 |

(Continued)

*Primary Examiner* — Imad Hussain
(74) *Attorney, Agent, or Firm* — FisherBroyles, LLP (57) ABSTRACT

The disclosed computer-implemented method may include encoding, by a first computing device, a control message by generating a sequence of network link statuses, monitoring, by a second computing device, the sequence of network link statuses, decoding, by the second computing device, the sequence of network link statuses, and remediating the second computing device based on the control message. Various other methods, systems, and computer-readable media are also disclosed.

20 Claims, 8 Drawing Sheets

(56) References Cited

U.S. PATENT DOCUMENTS

2018/0167269 A1* 6/2018 Vu ..................... G06F 11/2002

* cited by examiner

APPARATUSES, SYSTEMS, AND METHODS FOR LINK STATUS DETECTION AND REMEDIATION OF NETWORK ATTACHED DEVICES

BACKGROUND

Network attached devices (e.g., servers and computers) may provide a variety of services including remote storage of multi-media, web services and social media applications. When network attached devices fail to respond or function properly, remediation of non-functioning network attached devices may require rebooting or power cycling to return the device to a functioning state. Remediation of non-functioning network attached devices may be performed by a remote management function (e.g., baseboard management controller).

The remote management function may be implemented in the network attached device by a secondary processor, memory, operating system and network software stack operating independently from a primary processor, memory, operating system, and network software stack. The secondary processor executing the remote management function may receive control information over the network from another network attached device (e.g., network interface controller, network switch, or router). The control information which triggers the remediation function may be originated by a network administrator or automatically generated by a network attached device. The secondary processor, memory, operating system, and network software stack may provide control and management functions for the network attached device, however they may also increase the complexity, cost, and power consumption of the network attached device.

SUMMARY

As will be described in greater detail below, the instant disclosure describes apparatuses, systems, and methods for link status detection and remediation of network attached devices.

In one example, a computer-implemented method may include encoding, by a first computing device, a control message by generating a sequence of network link statuses. The method may further include monitoring, by a second computing device, the sequence of network link statuses. The method may further include decoding, by the second computing device, the sequence of network link statuses. The method may further include remediating the second computing device based on the control message.

In some examples, remediating the second computing device based on the control message may include cycling power to at least a portion of the second computing device.

In some examples, remediating the second computing device based on the control message may include rebooting a processor of the second computing device.

In some examples, rebooting the processor of the second computing device includes booting the processor from at least one of an alternate basic input output system (BIOS), an alternate-nonvolatile memory, or an alternate boot device.

In some examples, the decoding and remediation may be performed by a deterministic finite state machine device.

In some examples, the first computing device may comprise a network switch.

In some examples, decoding and remediation may not be performed by a general-purpose microprocessor executing computer-readable instructions.

In some examples, monitoring, by the second computing device, the sequence of network link statuses may comprise monitoring a shared medium communication network protocol.

In some examples, the network protocol may comprise an auto-negotiation protocol.

In some examples, the method may further include controlling a plurality of light emitting diodes with a signal pattern associated with the decoded control message.

In some examples, the method may further include monitoring the signal pattern controlling the plurality of light emitting diodes, determining the signal pattern is associated with the decoded control message, and remediating the second computing device based on the control message.

In one example, a system may include one or more physical processors and one or more memories coupled to one or more of the physical processors, the one or more memories including instructions operable when executed by the one or more physical processors to cause the system to perform operations including encoding, by a first computing device, a control message by generating a sequence of network link statuses. The operations may further include monitoring, by a second computing device, the sequence of network link statuses. The operations may further include decoding, by the second computing device, the control message from the sequence of network link statuses. The operations may further include remediating the second computing device based on the control message.

In some examples, the operations may further include remediating the second computing device based on the control message comprises cycling power to at least a portion of the second computing device.

In some examples, the operations may further include remediating the second computing device based on the control message comprises rebooting a processor of the second computing device.

In some examples, the operations may further include rebooting the processor of the second computing device by booting the processor from at least one of an alternate basic input output system (BIOS), an alternate-nonvolatile memory, or an alternate boot device.

In some examples, the operations may further include decoding and remediation performed by a deterministic finite state machine device.

In some examples, the first computing device is a network switch.

In some examples, the decoding and remediation are not performed by a general-purpose microprocessor executing computer-readable instructions.

In some examples, the operations may further include controlling a plurality of light emitting diodes with a signal pattern associated with the decoded control message. In some examples, the operations may further include monitoring the signal pattern controlling the plurality of light emitting diodes. In some examples, the operations may further include determining the signal pattern is associated with the decoded control message. In some examples, the operations may further include remediating the second computing device based on the control message.

In some examples, the above-described method may be encoded as computer-readable instructions on a computer-readable medium. For example, a computer-readable medium may include one or more computer-executable instructions that, when executed by at least one processor of a computing device, may cause the computing device to encode, by a first computing device, a control message by generating a sequence of network link statuses. In some examples, the instructions may cause the computing device to monitor, by a second computing device, the sequence of network link statuses. In some examples, the instructions may cause the computing device to decode, by the second computing device, the control message from the sequence of network link statuses. In some examples, the instructions may cause the computing device to remediate the second computing device based on the control message.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for link status detection and remediation of network attached devices. As will be explained in greater detail below, embodiments of the present disclosure may lower cost, size, power consumption, and complexity associated with remediation of networked attached devices as compared to traditional technology. Embodiments of the present disclosure may also increase the reliability of networked attached devices as compared to traditional technology.

Technologies for remediation of network attached devices may require additional components including an independent CPU, memory, supporting circuitry, and software. Technologies may also require a separate integrated circuit (e.g., baseboard management controller) and an interface between the network interface controller of the network attached device and the baseboard management controller. The components required for remediation control (e.g., independent CPU, memory, supporting circuitry, software, baseboard management controller and interface, etc.) may contribute to higher complexity, higher power consumption, higher cost and larger packaging of a network attached device as compared to embodiments of the present disclosure. Embodiments of the present disclosure eliminate the need for these additional components by using a low-level, low-complexity protocol.

Accordingly, as may be appreciated, the systems and methods described herein may improve the functioning of a computer (e.g., network attached device) that implements methods of link status detection and remediation of network attached devices. For example, these systems and methods may improve the functioning of the computer by improving reliability of a network attached device through fault remediation as explained in detail below. Additionally or alternatively, these systems and methods may improve the functioning of a computer by reducing the computing resources consumed to remediate a network attached device. In some examples, these systems and methods may improve the functioning of a network attached device by reducing complexity (e.g. CPU processing load), reducing power consumption, lowering cost and reducing packaging size of a network attached device.

In a networked computer system, various network attached devices (e.g., computing devices, client devices, web servers, media servers, data centers, etc.) may be attached to the network. The networked attached devices may at times fail to perform properly and/or respond to the network and may require a form of remediation in order to resolve the failure. In some examples, remediation may include rebooting and/or cycling the device power off and on to resolve the problem. In some examples, the remediation may include sending a control management message(s) to the device. Embodiments of the present disclosure provide methods for sending control management message(s) to the network attached device. The control management message(s) may function to remedy a problem associated with the network attached device and/or enable other control functions.

When a control message is sent to the networked attached device for remediation, the control message may originate in a network switch attached to the network attached device and/or from an upstream control device such as a network controller. In some examples, the control message may result from commands entered by a network administrator. When the control message is sent from the network switch, the network switch may encode the message into a plurality of signals and transmit the plurality of signals over the medium connecting the network switch to the networked attached device. In some examples, the network attached device may monitor and decode signals transmitted over the medium from the network switch. When control messages are received and decoded, the networked attached device may execute a function based on the control message. In some examples, the control message executed by the networked attached device may cause remediation of the networked attached device.

In some examples, control messages may be created by generating a specific pattern of network link statuses. The network link statuses may include, without limitation, a status indicating a speed of the network link (e.g., 10 Mbps, 100 Mbps, 1 Gbps, 10 Gbps, 100 Gbps, etc.) or a status indicating activity (e.g., a physical network link has been established, data packets are transferred on the link, etc.) on the network link. In some examples, the network link statuses may be indicated by the status of a plurality of LEDs controlled by a network interface controller in which the state of the LEDs is associated with the network link status. The control messages may be associated with a specific pattern of network link statuses. By monitoring the signals controlling the LEDs the control messages may be decoded, as described in detail below, and cause remediation of the network attached device.

In some examples, the pattern of network link statuses may include changing the link speed. For example, changing the link speed from a higher speed (e.g., 1 Gbps) to a lower speed (e.g., 100 Mbps) and then back to a higher speed (e.g., 1 Gbps). In some examples, the pattern of network link statuses may include changing the status of the network link from active to inactive and then back to active. In some examples, the pattern of network link statuses may include, without limitation, changing a combination of link speeds and link activity status. In some examples, changing the network link status may result in initiating an auto-negotiation cycle. Initiating an auto-negotiation cycle may cause the status of the LEDs to change.

In some examples, a network device connected to the network attached device may be commanded to initiate the pattern of network link statuses by a network administrator, a program running in the network device, a program running in a network controller, a program running on another network attached device, or a combination thereof.

In some examples, the pattern of network link statuses associated with the control message may include a specific timing of the pattern. For example, when changing the speed of the network link and/or changing the link activity status, a specific period of time (e.g., 10 seconds, 20 seconds, 30 seconds, 40 seconds, etc.) may lapse between the changes. In some examples, the pattern of network link statuses associated with the control message may include a specific number of changes in the link statuses. For example, the link speed may be changed a specific number of times, the link activity status may be changed a specific number of times, a combination of link speed and link activity may be changed a specific number of times, or a combination thereof.

In some examples, when a network attached device is connected to a network switch over a medium, the network switch and the network attached device may auto-negotiate certain communication parameters in order to maximize the performance of the network connection. In some examples, the auto-negotiation process may conform to the IEEE 802.3 standard for networking. Auto-negotiation may be a signaling mechanism and procedure used by networks (e.g., Ethernet over twisted pair) so that a network switch and a network attached device may choose common transmission parameters, including, without limitation, control messages (e.g., remediation control messages), transmission speed, duplex mode, and flow control. During the auto-negotiation process, the network switch and the network attached device first share their capabilities regarding the transmission and control parameters and then choose the highest performance transmission mode they both support. Auto-negotiation may be used by network devices that are capable of more than one transmission rate, different duplex modes (half duplex and full duplex), and different standards at the same speed.

A network may connect multiple network attached devices using a variety to topologies, including without limitation, point to point, bus, mesh, tree, ring and star. In some examples, the networked attached devices may be connected to a router or a network switch. The network switch may have a direct connection to the network attached device. The connection between the network switch and the networked attached device may be over a medium. The medium may include, without limitation, fiber optic cable, twisted pair, coaxial, or power line.

As described above, the network switch may encode control messages (e.g., remediation control messages) within the signaling mechanism of the auto-negotiation process and transmit the signals to the network attached device. The network attached device connected to the network switch may receive and monitor the signals sent from the network switch. The network attached device may decode the received signals into control messages and perform functions based on the decoded control messages. In some examples, the control messages may cause the network attached device to remedy a fault within the network attached device. The remediation method may include rebooting, resetting, and/or power cycling at least a portion of the network attached device in order to remedy the fault.

In some examples, the control message may be generated by a network device connected to the network attached device. The network device generating the control message may be, without limitation, a network switch, a network controller, or a network administrator console. The control message may be received over a network by the network attached device and processed by a network interface controller and a remediation system controller as described below in detail. In some examples, the control message may be received and processed by a network interface controller and a remediation system controller rather than a network interface controller and a baseboard management controller.

In some examples, control messages may be sent over a physical layer protocol as defined by the Open Systems Interconnect (OSI) model. In some examples, control messages may be sent over the physical layer of the IEEE 802.3 (Ethernet) networking protocol rather than a protocol layer higher than the physical layer such as a data link layer, a network layer, a transport layer, a session layer, a presentation layer, or an application layer.

As described in detail below, control messages which are received, decoded and executed by a network attached device may function to remediate the network attached device or perform control functions for subsets of components and/or systems of the network attached device.

In some examples, the encoded control messages may be received by a network interface controller within the network attached device. The network interface controller may decode the control messages. The network interface controller may output signals which control a plurality of light emitting diodes (LEDs). In some examples, the network interface controller may control a plurality of LEDs in accordance with a status of the network link attached to the network attached device. A blinking LED may mean activity on the network link. The status LEDs may be of different colors (e.g., green and/or amber). Blinking of the LEDs may indicate, without limitation, a network link speed, a network link status, or network activity. In some examples, the LEDs may be static, and the LED color may indicate the link speed. When the LED is amber, the network link may operate at 100 Mbps, when the amber LED is off, the network link may operate at 10 Mbps. When the LED is green the network link may operate at 1 Gbps. In some examples, the network interface controller may decode the control messages and provide a unique signal pattern to the plurality of LEDs which is associated with the control messages. Each control message may be associated with a unique signal pattern to the LEDs.

In some examples, the network link may supply both data communication and power (e.g., power over Ethernet) to the network attached device. Data communication and power may be supplied to the network attached device over a single cable. Supplying power and data communication over a single cable may make installing or expanding a network simpler and lower cost as compared to separate power and communication cables. In some examples, remediation of a network attached device may be executed by cycling power supplied to the network attached device over the network cable. For example, turning off the power in the cable being supplied to the network attached device and then turning the power back on. A device (e.g., remediation system controller) within the network attached device may monitor the signal pattern provided by the network interface controller to the plurality of LEDs. The remediation system controller may decode the monitored signal pattern provided to the LEDs. In some examples, the remediation system controller may decode control messages which may be associated with a unique signal pattern provided to the LEDs by the network interface controller. In some examples, the control messages decoded from the unique LED pattern may cause the remediation system controller to remediate the network attached device. The remediation may cause the network attached device to remedy a fault. The remediation may be a rebooting a processor and/or power cycling at least a portion of the network attached device. In some examples, the remediation system controller may be implemented using computer logic in the form of a discrete state machine, a programmable logic device, a processor executing instructions stored in a memory, or a combination thereof.

In some examples, the remediation system controller may execute remediation commands associated with the control messages. The remediation commands may cause the remediation system controller to reboot a central processing unit in the network attached device. The remediation system controller may send a command to the central processing unit to reboot and/or provide a discrete digital signal to the central processing unit causing it to reboot. In some examples, rebooting the central processing unit may cause the central processing unit to retrieve instructions from a default (e.g., primary) storage location and begin executing those instructions. The executed instructions may collectively be a basic input/output system (BIOS). In some examples, the default storage location may reside in a non-volatile memory and/or a primary boot device (e.g., hard drive, flash drive, optical drive, EEPROM, etc.).

In some examples, the instructions executed from the primary storage location may be faulty and cause the network attached device to require remediation. In this case, the remediation system controller may send a command to the central processing unit to reboot the central processing unit by executing instructions from an alternate storage location, which is different from the primary storage location. The alternate storage location may include instructions which are known to be reliable and non-faulty. The instructions executed from the alternate storage location may collectively be a basic input/output system (BIOS). In some examples, the alternate storage location may reside in a non-volatile memory and/or a primary boot device (e.g., hard drive, flash drive, optical drive, EEPROM, etc.) different from the primary non-volatile memory and/or a primary boot device.

In some examples, the remediation commands may cause the remediation system controller to cycle power to at least a portion of the network attached device. The remediation system controller may send a command and/or a discrete signal to a power supply controller to cycle the power. In some examples, the remediation system controller may directly or indirectly interrupt the power supply to at least a portion of the network attached device.

In some examples, the remediation commands may require an authentication process before execution in order to prevent unauthorized remediation or hacking of the network attached device. Execution of the remediation commands may require prior authentication using various methods, including without limitation, secure sockets layer (SSL) protocol, password authentication protocol, digital certificate, remote authentication dial in user service (RADIUS) and extensible authentication protocol.

The following will provide, with reference to FIGS. 1-8, detailed descriptions of apparatuses, systems, and methods for link status detection and remediation of network attached devices.

Figure 1:
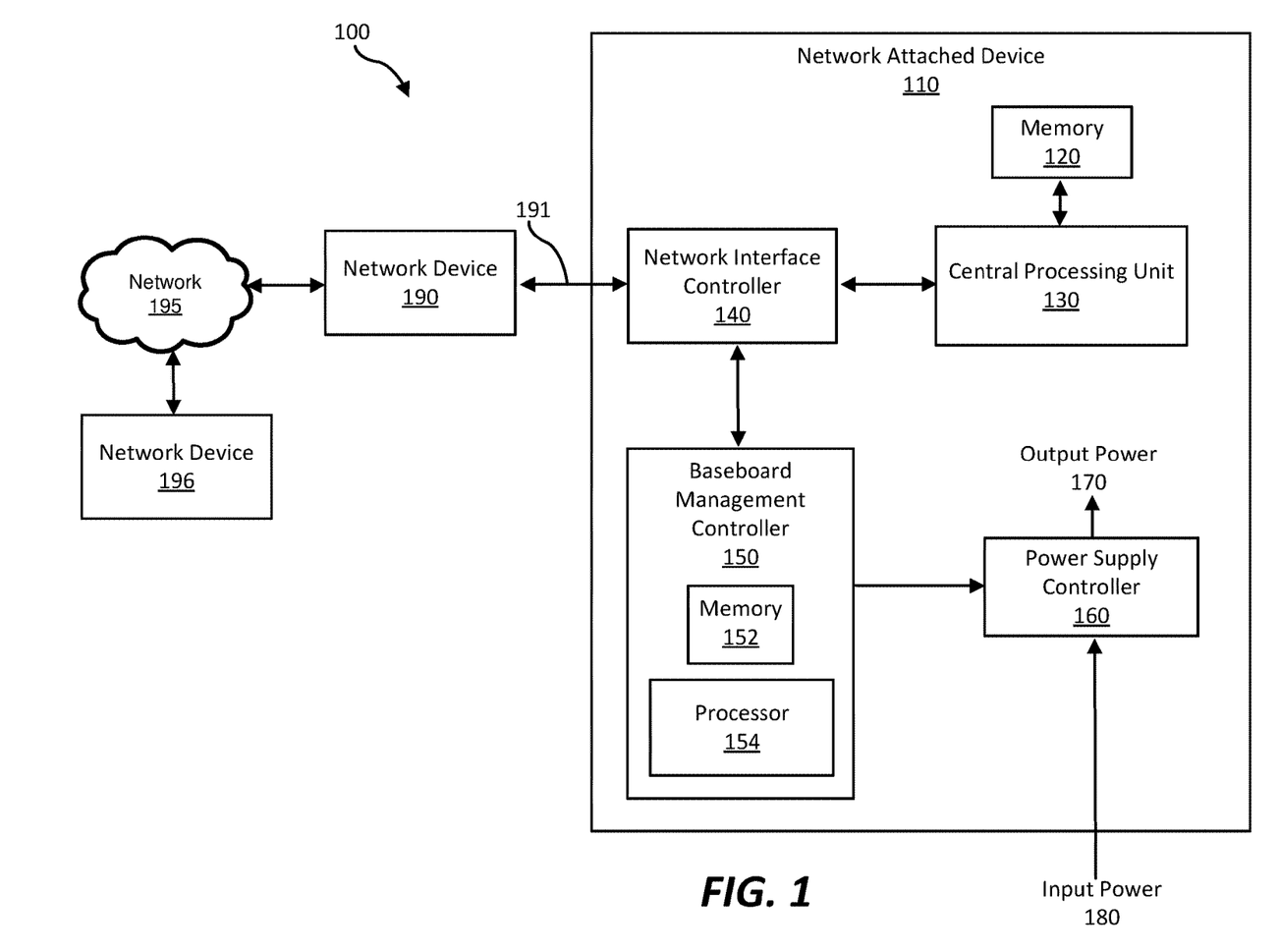
FIG. 1 is an example of a block diagram of a network attached device including a baseboard management controller.

FIG. 1 is an example of a block diagram of a network attached device including a baseboard management controller. As shown in FIG. 1, computer network system 100 may include network devices 190, 196, network 195 and network attached device 110. Network devices 190 and 196 may include, without limitation, a network switch, a network controller, a router, a computer, a server, a bridge, a repeater, a firewall, a hub, or a combination thereof. Network device 190 may connect network attached device 110 to network 195. Network 195 may include, without limitation, the Internet, a local area network, a wide area network, a metropolitan area network, a storage area network, an enterprise private network, a virtual private network, or a combination thereof. Network device 196 may communicate with network attached device 110 through network 195 and network device 190. In some examples, network attached device 110 may provide computing and/or data services through network connection 191 to multiple devices connected to network 195. Network attached device 110 may include central processing unit 130 and memory 120. Network attached device 110 may provide computing and/or data services by executing instructions stored in memory 120 on central processing unit 130. Network attached device 110 may include power supply controller 160. Power supply controller 160 may receive input power 180 in the form of AC or DC power and convert input power 180 into output power 170. Output power 170 may provide power to the components included in network attached device 110.

In some examples, network attached device 110 may experience a failure which prevents network attached device 110 from properly providing computing and/or data services. In order to remedy the failure, network attached device 110 may require a reboot and/or power cycling (e.g., turning the power off and then back on). Network attached device 110 may include baseboard management controller 150. In some examples, baseboard management controller 150 may cycle the power by sending a control signal to power supply controller 160. Power supply controller 160 may cycle the power to at least a portion of the components in the networked attached device 110 in order to remedy the failure preventing network attached device 110 from properly providing computing and/or data services. In some examples, baseboard management controller 150 may receive a control message from network interface controller 140 commanding baseboard management controller 150 to cycle the power. In some examples, the control message to cycle the power may originate from network interface controller 140, network device 190, network device 196, or another device connected to network 195. The control message to cycle the power may be received by the network interface controller 140 and be provided to the baseboard management controller 150 as either pass-through and/or control traffic using a network controller sideband interface. The baseboard management controller 150 may implement the Intelligent Platform Management Interface (IPMI) protocol. IPMI may be a set of interface specifications implemented in the baseboard management controller 150 for autonomous control that provides management and monitoring capabilities independently of the central processing unit 130. IPMI may define a set of interfaces used by network system administrators for out-of-band management of network attached device 110. Baseboard management controller 150 may implement a network controller sideband interface such as IPMI by executing code stored in memory 152 on processor 154.

Figure 2:
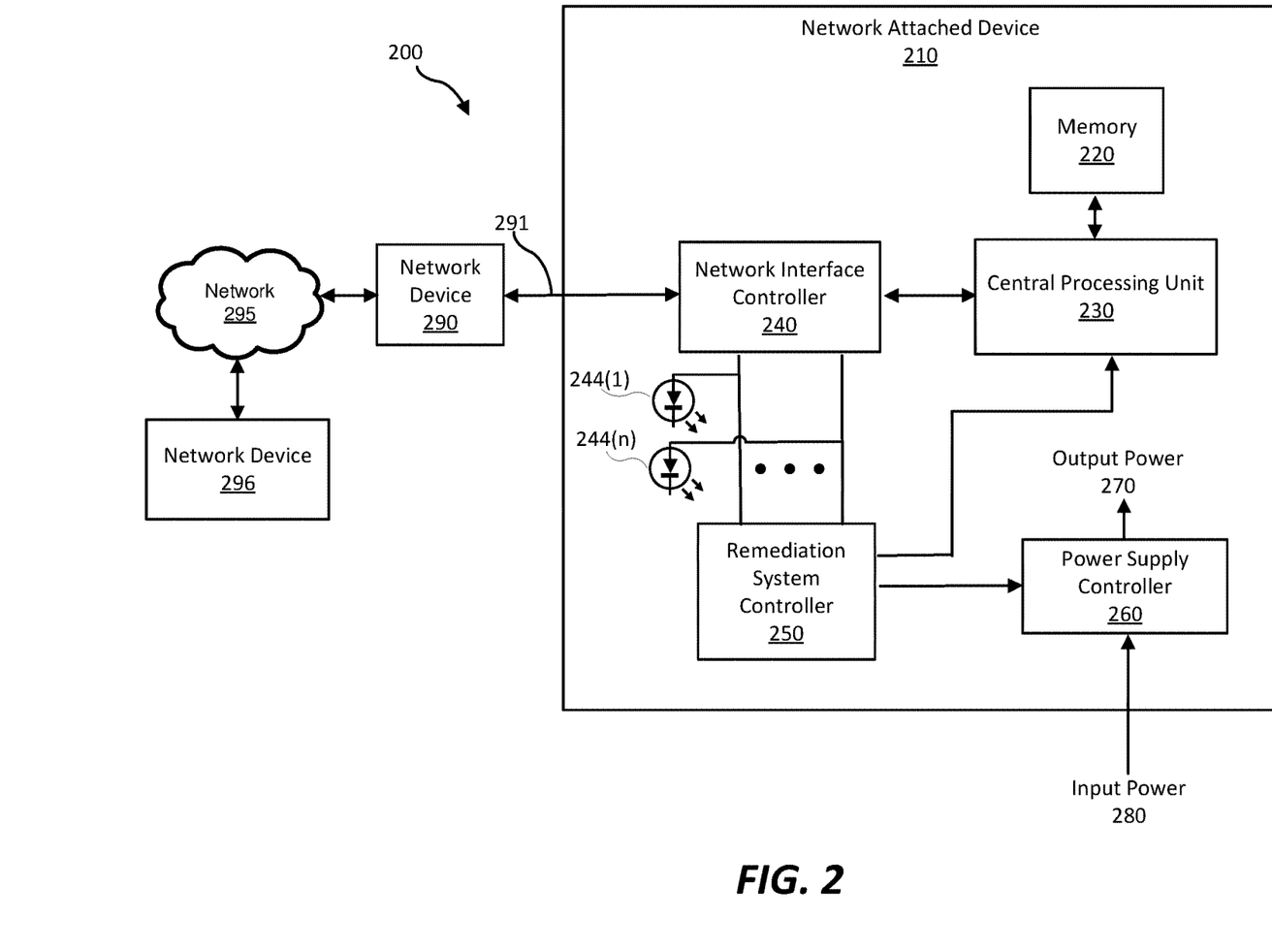
FIG. 2 is an example of a block diagram of a network attached device including a remediation system controller.

FIG. 2 is an example of a block diagram of a network attached device including a remediation system controller. As shown in FIG. 2, a computer network system 200 may include network devices 290, 296, network 295 and network attached device 210. Network devices 290 and 296 may include, without limitation, a network switch, a network controller, a router, a computer, a server, a bridge, a repeater, a firewall, a hub, or a combination thereof. Network device 290 may connect network attached device 210 to network 295. Network 295 may include, without limitation, the Internet, a local area network, a wide area network, a metropolitan area network, a storage area network, an enterprise private network, a virtual private network, or a combination thereof. Network device 296 may communicate with network attached device 210 through network 295 and network device 290. In some examples, network attached device 210 may provide computing and/or data services through network connection 291 to devices connected to network 295. Network attached device 210 may include central processing unit 230 and memory 220. Network attached device 210 may provide computing and/or data services by executing instructions stored in memory 220 on central processing unit 230. Network attached device 210 may include power supply controller 260. Power supply controller 260 may receive input power 280 in the form of AC or DC power and convert input power 280 into output power 270. Output power 270 may provide power to the components included in network attached device 210.

In some examples, network attached device 210 may experience a failure which prevents network attached device 210 from properly providing computing and/or data services. In order to remedy the failure, network attached device 210 may require a reboot and/or power cycling (e.g., turning the power off and then back on). Network attached device 210 may include remediation system controller 250. In some examples, remediation system controller 250 may cycle the power by sending a control signal to power supply controller 260. Power supply controller 260 may cycle the power to at least a portion of the components in the networked attached device 210 in order to remedy the failure preventing network attached device 210 from properly providing computing and/or data services. Additionally or alternatively, remediation system controller 250 may provide a signal to central processing unit 230 to reset central processing unit 230 to a known condition. In some examples, remediation system controller 250 may receive a control message from network interface controller 240 commanding remediation system controller 250 to cycle the power and/or reset the central processing unit 230. In some examples, the control message to cycle the power may originate from network interface controller 240, network device 290, network device 296, or another device connected to network 295. In some examples, network device 290 may be the only device capable of sending a control message to the network attached device requiring remediation. The control message may be received by network interface controller 240 and provided to remediation system controller 250.

In some examples, network device 290 may encode the control messages (e.g., remediation control message) within the signaling mechanism of the auto-negotiation process and transmit the signals to network interface controller 240. Network interface controller 240 may receive and monitor the signals sent from network device 290 over network connection 291. Network interface controller 240 may decode the received signals into control messages and perform functions based on the decoded control messages.

In some examples, network device 290 may encode the control messages by generating a specific pattern of network link statuses. The network link statuses may include, without limitation, a status indicating a speed of the network link (e.g., 10 Mbps, 100 Mbps, 1 Gbps, 10 Gbps, 100 Gbps, etc.) or a status indicating the link is 'up' or activity (e.g., a physical network link has been established, data packets are transferred on the link, etc.) on the network link 291. In some examples, the network link statuses may be indicated by the status of LEDs 244(1) . . . 244(n) controlled by network interface controller 240. The control messages may be associated with a specific pattern of network link statuses. By monitoring the signals controlling LEDs 244(1) . . . 244(n), the control messages may be decoded, and cause remediation of the network attached device.

In some examples, the pattern of network link statuses associated with the control message may include a specific timing of the pattern. For example, when changing the speed of the network link and/or changing the link activity status, a specific period of time (e.g., 10 seconds, 20 seconds, 30 seconds, 40 seconds, etc.) may lapse between the changes. In some examples, the pattern of network link statuses associated with the control message may include a specific number of changes in the link statuses. For example, the link speed may be changed a specific number of times, the link activity status may be changed a specific number of times, a combination of link speed and link activity may be changed a specific number of times, or a combination thereof. Remediation system controller 250 may monitor the number of changes in link statuses and the timing between changes in link statuses to decode the control messages.

In some examples, network interface controller 240 may output signals which control light emitting diodes (LEDs) 244(1) . . . 244(n). Network interface controller 240 may decode control messages and provide a unique signal pattern to LEDs 244(1) . . . 244(n) which is associated with each of the control messages. Each control message may be associated with a unique signal pattern provided to LEDs 244(1) . . . 244(n).

In some examples, remediation system controller 250 within network attached device 210 may monitor the signal pattern provided by the network interface controller to LEDs 244(1) . . . 244(n). Remediation system controller 250 may decode the monitored signal pattern provided to (LEDs) 244(1) . . . 244(n). In some examples, remediation system controller 250 may decode control messages which are associated with the unique signal pattern provided to LEDs 244(1) . . . 244(n). The control messages decoded from the unique LED pattern may cause remediation system controller 250 to remediate network attached device 210. The remediation may cause the network attached device to remedy a fault in network attached device 210 by cycling the power or providing a reset signal to central processing unit 230 as described in more detail above. In some examples, remediation system controller 250 may operate independently of central processing unit 230 and therefore continue to function properly even when central processing unit 230 has failed to function properly. In some examples, remediation system controller 250 may be implemented using computer logic in the form of a discrete state machine, a programmable logic device, a processor executing instructions stored in a memory, or a combination thereof.

Figure 3:
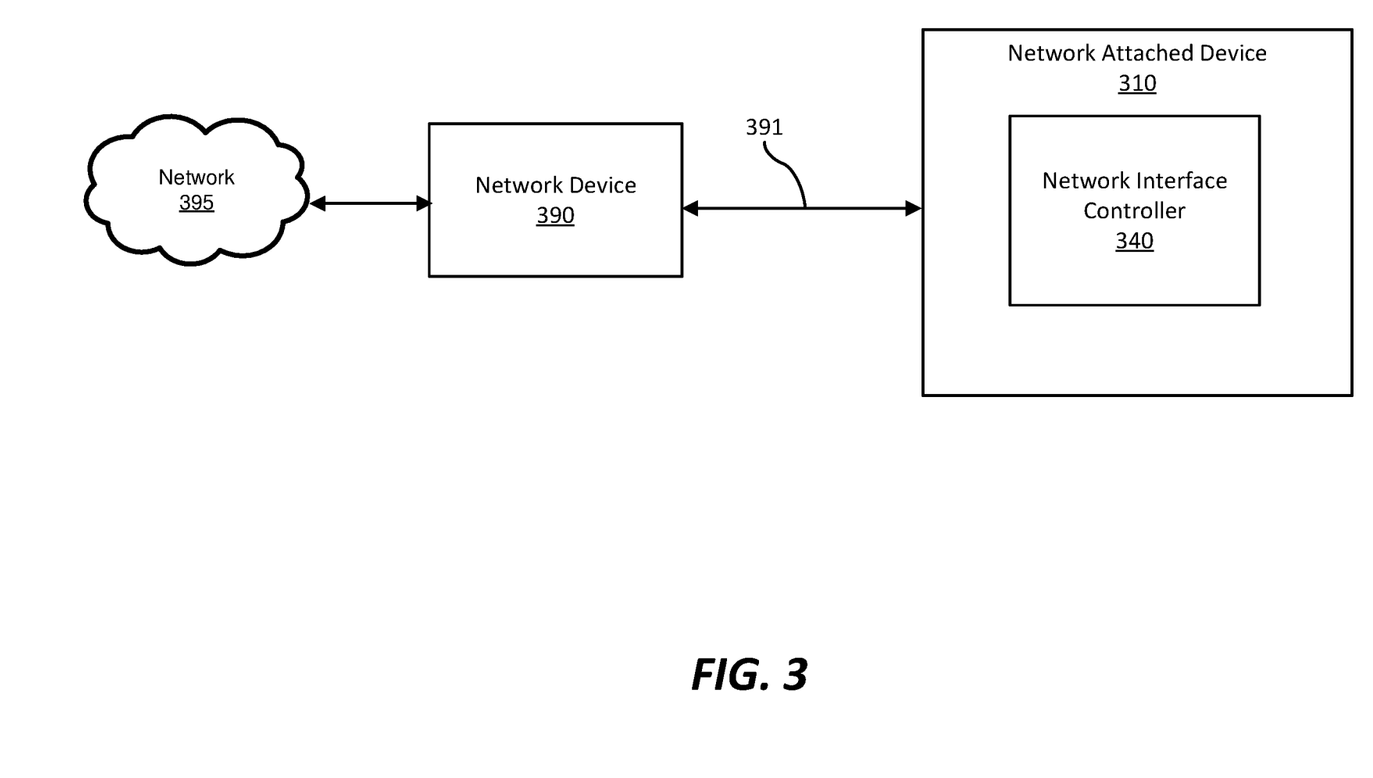
FIG. 3 is an example of a block diagram of a network attached device auto-negotiating network parameters with a network device.

FIG. 3 is an example of a block diagram of a network attached device auto-negotiating network parameters with a network device. As shown in FIG. 3, network device 390 (e.g., network switch, router, network controller, etc.) and network attached device 310 (e.g., computer, server, access point, etc.) may auto-negotiate parameters to enable network device 390 and network attached device 310 to communicate with one another over network link 391. In some examples, network device 390 and network attached device 310 may auto-negotiate parameters to enable network device 390 and network attached device 310 to communicate with network 395. Network 395 may include without limitation, a public network, a private network, the Internet, or a combination thereof. Network device 390 and network attached device 310 may cooperatively execute an auto-negotiation protocol. Auto-negotiation may be a signaling mechanism and protocol used by network device 390 and network attached device 310 to choose common transmission parameters for communicating over network link 391, including but not limited to speed, duplex mode, and flow control. Network attached device 310 may execute the auto-negotiation protocol in network interface controller 340. In the auto-negotiation protocol, network device 390 and network attached device 310 may first share their capabilities regarding the network parameters and then choose the highest performance transmission mode supported by both network device 390 and network attached device 310. Network device 390 and network attached device 310 may be capable of more than one transmission rate, different duplex modes (e.g., half duplex and full duplex), and different standards at the same speed. Network device 390 and network attached device 310 may each declare its technology abilities, that is, its possible modes of operation, and the best mode is chosen, with higher speed preferred over lower speed, and full duplex preferred over half duplex at the same speed. In some examples, network device 390 and network attached device 310 may communicate using an Ethernet protocol after a successful auto-negotiation protocol is executed.

In some examples, auto-negotiation may be a signaling mechanism and protocol used by network device 390 and network attached device 310 to communicate control messages, including, but not limited to, remediation control messages. Network device 390 may encode and send control messages to network attached device 310. In some examples, network device 390 may encode the control messages in a specific pattern of link statuses as described in detail above. Network interface controller 340 may decode the control messages to be executed by network attached device 310. In some examples, network attached device 310 may execute the control messages. Execution of the control messages may cause remediation of network attached device 310. In some examples, remediation of network attached device 310 may include cycling power to a portion of network attached device 310. In some examples, remediation of network attached device 310 may include rebooting a processor of network attached device 310. In some examples, remediation of network attached device 310 may include resetting a portion of network attached device 310.

Figure 4:
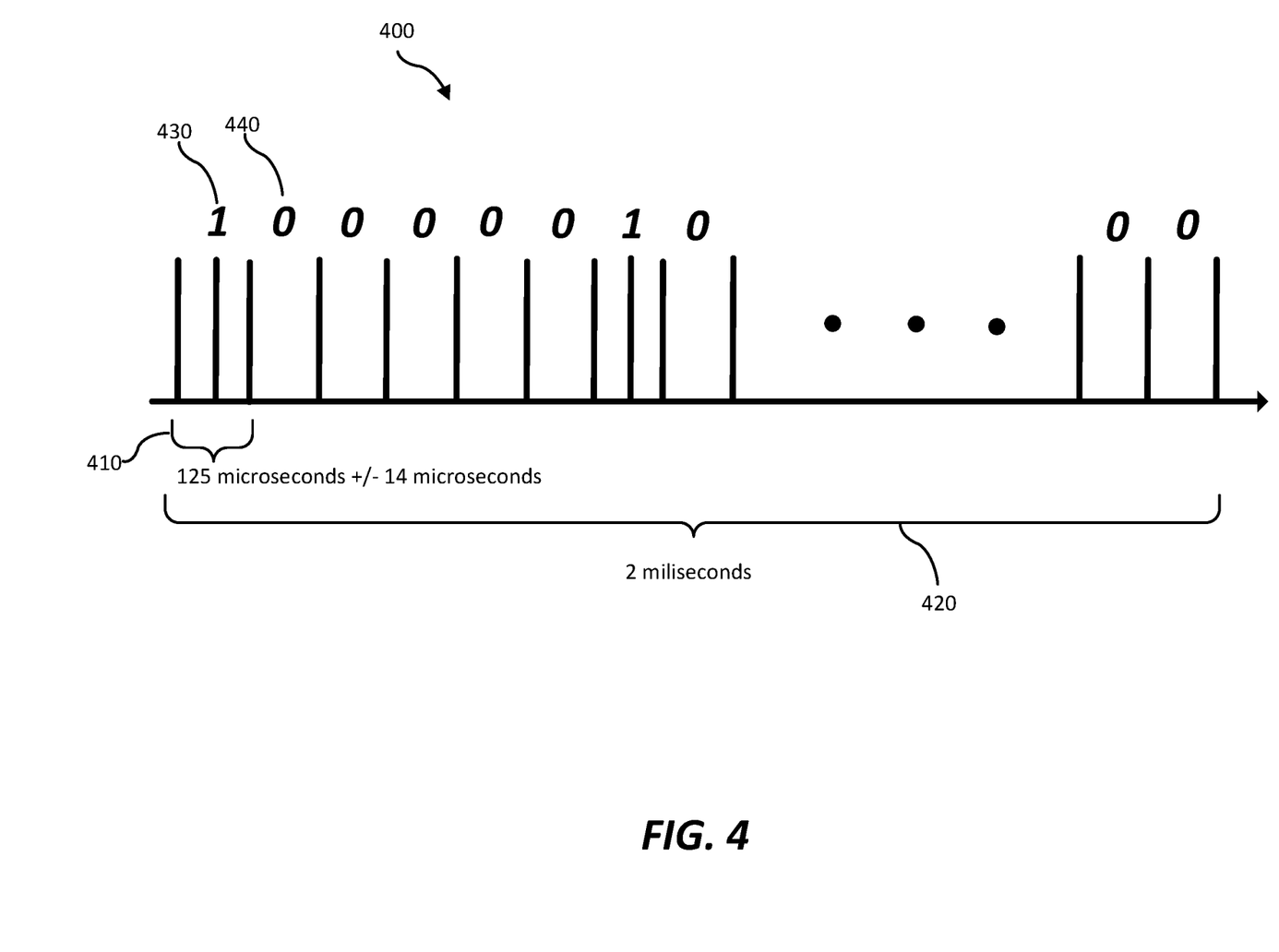
FIG. 4 illustrates an example of link code words sent by a network attached device during an auto-negotiating process.

FIG. 4 illustrates an example of link code words 400 sent by a network attached device during an auto-negotiation process. As shown in FIG. 4, an auto-negotiation process may use fast link pulses to communicate network parameters and/or control messages. Fast link pulses may consist of a burst of normal link pulses. In some examples, a fast link pulse may include 17 normal link pulses at a 125-microsecond time interval 410 transmitted over a 2-millisecond period 420. The 125-microsecond time interval 410 may have a tolerance of plus or minus 14 microseconds. Between each pair of two consecutive normal link pulses (i.e. at 62.5 microseconds after the first normal link pulse of the pulse pair) an additional positive pulse may be sent. The presence of this additional positive pulse indicates a logical 1 430 is sent, its absence indicates a logical 0 440 is sent. As a result, every fast link pulse contains a data word of 16 bits. This data word may be a link code word (LCW). The bits of the link code word are numbered from 0 to 15, where bit 0 corresponds to the first possible pulse in time and bit 15 to the last.

In some examples, a link code word may represent network parameters used during an auto-negotiation process. In some examples, a link code word may represent control messages used to remediate a network attached device. For example, referring again to FIG. 3, network device 390 may send a link code word representing a remediation control message to network attached device 310. Network interface controller may receive and decode the link code word representing a remediation control message. In response to receiving the link code word representing a remediation control message, network attached device 310 may execute the control message and remediate network attached device 310.

Figure 5:
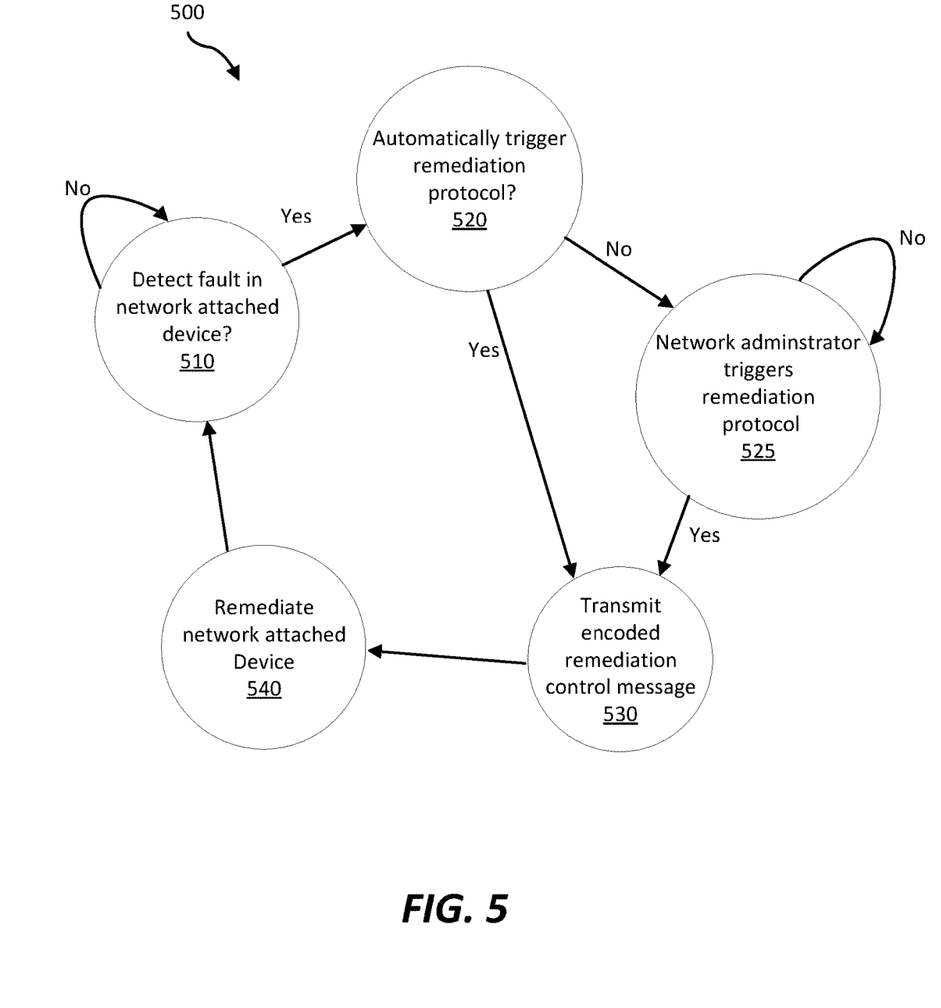
FIG. 5 is a state machine of an example method for triggering a remediation protocol.

FIG. 5 is an example state machine of a method for triggering a remediation protocol. As shown in FIG. 5, state machine 500 may be a deterministic finite state machine and function to trigger a remediation protocol. In some examples, state 510 may monitor a network attached device to detect a fault in the network attached device which requires remediation. The fault may include without limitation, a lack of response to a network device, a lack of proper response to a network device (e.g., high latency), a lack of access to data stored on the network attached device, or a combination thereof. If no fault requiring remediation is detected, state machine 500 remains in state 510. If a fault requiring remediation is detected, state machine 500 proceeds to state 520. In state 520, state machine 500 determines if a remediation protocol should be automatically triggered. In one embodiment, a fault in a network attached device requiring remediation may be detected by another network attached device which is unable to communicate with the network attached device. In this case, a network switch connected to the network attached device requiring remediation is commanded to change the link status in a specific pattern that is detected by the remediation system controller. The remediation system controller may detect the specific pattern associated with resetting and/or power cycling of the network attached device and perform the resetting and/or power cycling. If state 520 determines that a remediation protocol should be automatically triggered, state machine 500 proceeds to state 530. In some examples, a remediation protocol may be automatically triggered a program running in the network device, a program running in a network controller, a program running on another network attached device, or a combination thereof. If state 520 determines that a remediation protocol should not be automatically triggered, state machine 500 proceeds to state 525. In state 525, state machine 500 determines if a network administrator has triggered a remediation protocol. If a network administrator has not triggered a remediation protocol state machine 500 remains in state 525. If a network administrator has triggered a remediation protocol, state machine 500 proceeds to state 530. In state 530, state machine 500 transmits a remediation control message from a network device to a network attached device and proceeds to state 540. In state 540, state machine 500 remediates the network attached device as described in detail above and returns to state 510 to monitor and detect a fault in the network attached device.

Figure 6:
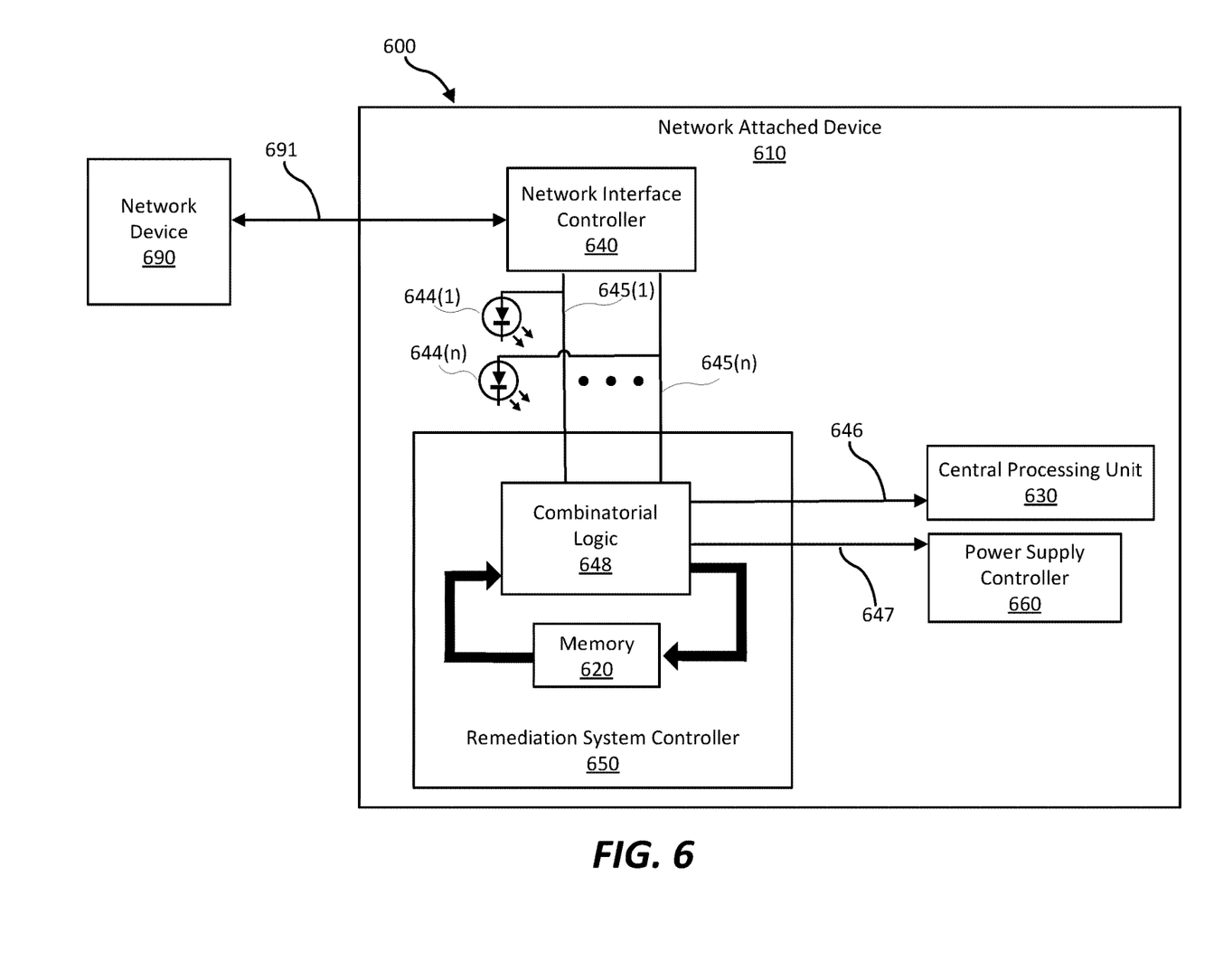
FIG. 6 is an example block diagram of a circuit for executing a remediation protocol.

FIG. 6 is an example block diagram of a circuit for executing a remediation protocol. As shown in FIG. 6, circuit 600 may function to remediate a network attached device. Circuit 600 may include network interface controller 640 in communication with network device 690 over communication link 691. Network interface controller 640 may receive communication packets from network device 690 over communication link 691. In some examples, network interface controller 640 may decode the communication packets which may indicate the status of the communication link for example, the communication status may include, without limitation, power status, a remediation status, a communication link speed, and a link activity status. Network interface controller 640 may control LEDs 644(1) . . . 644(n) using signal lines 645(1) . . . 645(n) based on the communication link status. In some examples, LEDs 644(1) . . . 644(n) may flash, stay on, stay off and/or display different colors based on the communication status.

In some examples, network interface controller 640 may receive a remediation control message(s) from network device 690. Network interface controller 640 may control LEDs 644(1) . . . 644(n) based on the remediation message(s). In some examples, remediation system controller 650 may monitor signal lines 645(1) . . . 645(n) which control LEDs 644(1) . . . 644(n). Remediation system controller 650 may include combinatorial logic 648 and memory 620. Remediation system controller 650 may implement the finite state machine described below in FIG. 7.

In some examples, remediation system controller 650 may be used instead of a baseboard management controller, processor, and memory. In some examples, implementing remediation system controller 650 using combinatorial logic 648 and memory 620 may lower the cost of network attached device 610 due to having a smaller silicon die area as compared to a traditional solution including a baseboard management controller, processor, and memory. In some examples, implementing remediation system controller 650 using combinatorial logic 648 and memory 620 may lower the power consumption of network attached device 610 due to having a lower total transistor count and/or lower clock speed as compared to a traditional solution including a baseboard management controller, processor, and memory. In some examples, implementing remediation system controller 650 using combinatorial logic 648 and memory 620 may reduce the physical size of network attached device 610 due a smaller package size required for combinatorial logic 648 and memory 620 as compared to a traditional solution including a baseboard management controller, processor, and memory. In some examples, remediation system controller 650 including combinatorial logic 648 and memory 620 may be implemented in a low cost, small size, low power consumption device (e.g., field programmable gate array, CPLD, other programmable logic device, etc.). In some examples, remediation system controller 650 may be implemented using available combinatorial logic and memory in network interface controller 640 or other available combinatorial logic and memory in network attached device 610.

In some examples, remediation system controller 650 may include combinatorial logic 648 and memory 620. Combinatorial logic 648 may receive inputs from, without limitation, signal lines 645(1) . . . 645(n) and memory 620. Memory 620 may include D type flip flops to store the previous state transition. Remediation system controller 650 may also include timer(s) so that state transitions may be qualified by various time elements. Combinatorial logic 648 may output signals including, without limitation, signals 646 and 647. Combinatorial logic 648 may determine a next state transition and/or the state of signals 646 and 647 based on input signals lines 645(1) . . . 645(n) and a previous state transition stored in memory 620. Combinatorial logic 646 may be a circuit designed by combining various Boolean logic gates to produce a specific output for all possible input combinations. Combinatorial logic 646 may function to determine what output signals 646 and 647 should be. Outputs 646 and 647 may be derived by the current state value and the current inputs. Combinatorial logic 648 may function to determine what the next state value should be of remediation system controller 650. For example, when network interface controller 640 receives a remediation control message, network interface controller 640 may sequentially control signal lines 645(1) . . . 645(n) based on the remediation control message. Combinatorial logic 648 may determine a remediation control message has been received and the type of remediation control message based on the sequence of signals on control signal lines 645(1) . . . 645(n) and the present state input from memory 620. Based on the type of remediation control message, remediation system controller 650 may control signal lines 646 and 647 to central processing unit 630 and/or power supply controller 660. In some examples, when the remediation control message indicates remediation should be in the form of power cycling, remediation system controller 650 may control signal 647 to cycle power to a portion of network attached device 610. In some examples, when the remediation control message indicates remediation should be in form of rebooting processor 630, remediation system controller 650 may provide signal 646 to reboot processor 630.

Figure 7:
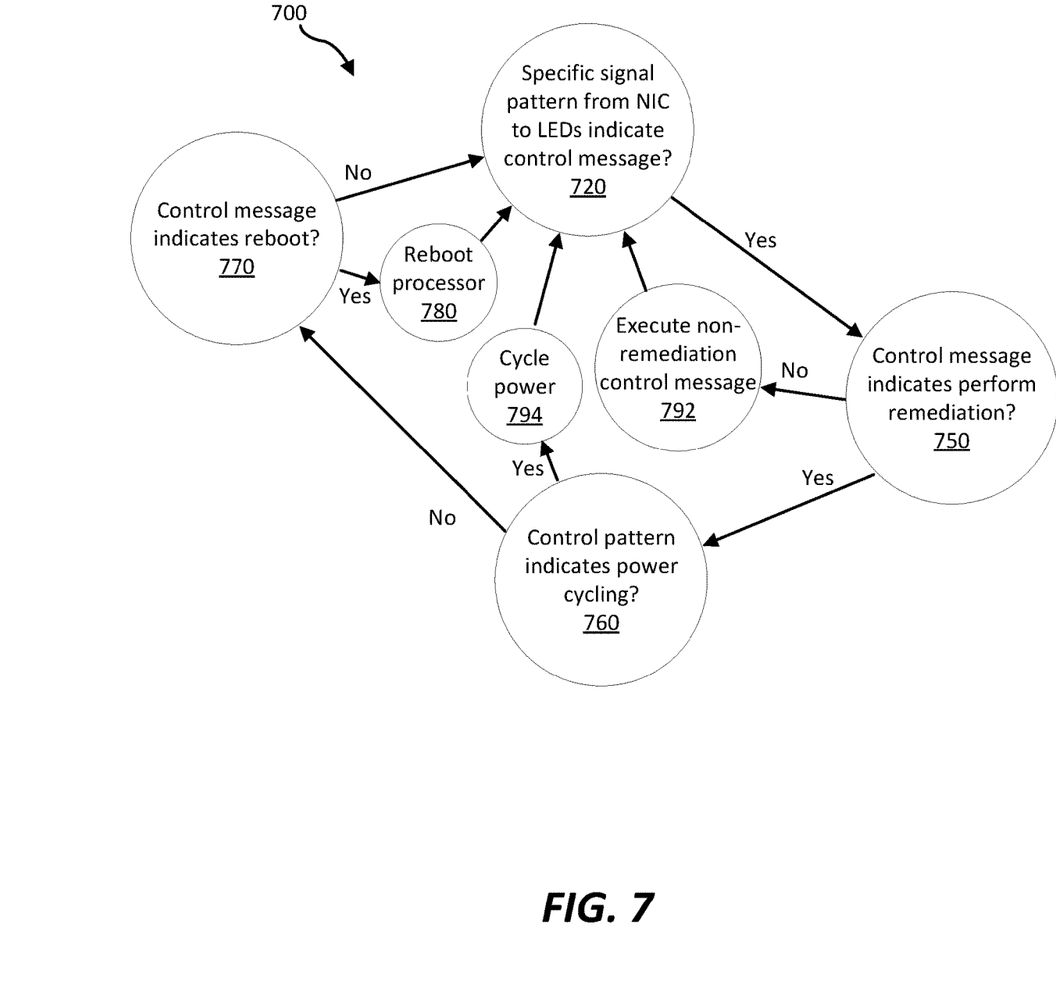
FIG. 7 is a state machine of an example method for remediating a network attached device.

FIG. 7 is a state machine of an example method for remediating a network attached device. As shown in FIG. 7, state machine 700 may be a deterministic finite state machine which functions to remediate a network attached device. In some examples, remediation may be required for a network attached device when a fault has been detected in the network attached device. The fault may include without limitation, a lack of response to a network device, a lack of proper response to a network device, a lack of access to data stored on the network attached device, or a combination thereof.

In some examples, state 720 may monitor a signal pattern from a network interface controller to a set of LEDs. If the signal pattern indicates a specific signal pattern associated with a control message, state machine 700 proceeds to state 750. In state 750, state machine 700 determines if the control message is a remediation control message. If the message is not a remediation control message, the non-remediation control message is executed in state 792 and state machine 700 returns to state 720 to continue monitoring the LED signals. If the message is a remediation control message, state machine 700 proceeds to state 760 to determine if the remediation method is power cycling. If the remediation method is power cycling, at least a portion of the power to a network attached device is cycled in state 794 and state machine 700 returns to state 720 to continue monitoring the LED signals. If the remediation method is not power cycling, state machine 700 proceeds to state 770 to determine if the remediation method is rebooting a processor. If the remediation method is rebooting a processor, in step 780 a processor(s) of the network attached device is rebooted and state machine 700 returns to state 720 to continue monitoring the LED signals. If the remediation method is not rebooting a processor, state machine 700 returns to state 720 to continue monitoring the LED signals.

Figure 8:
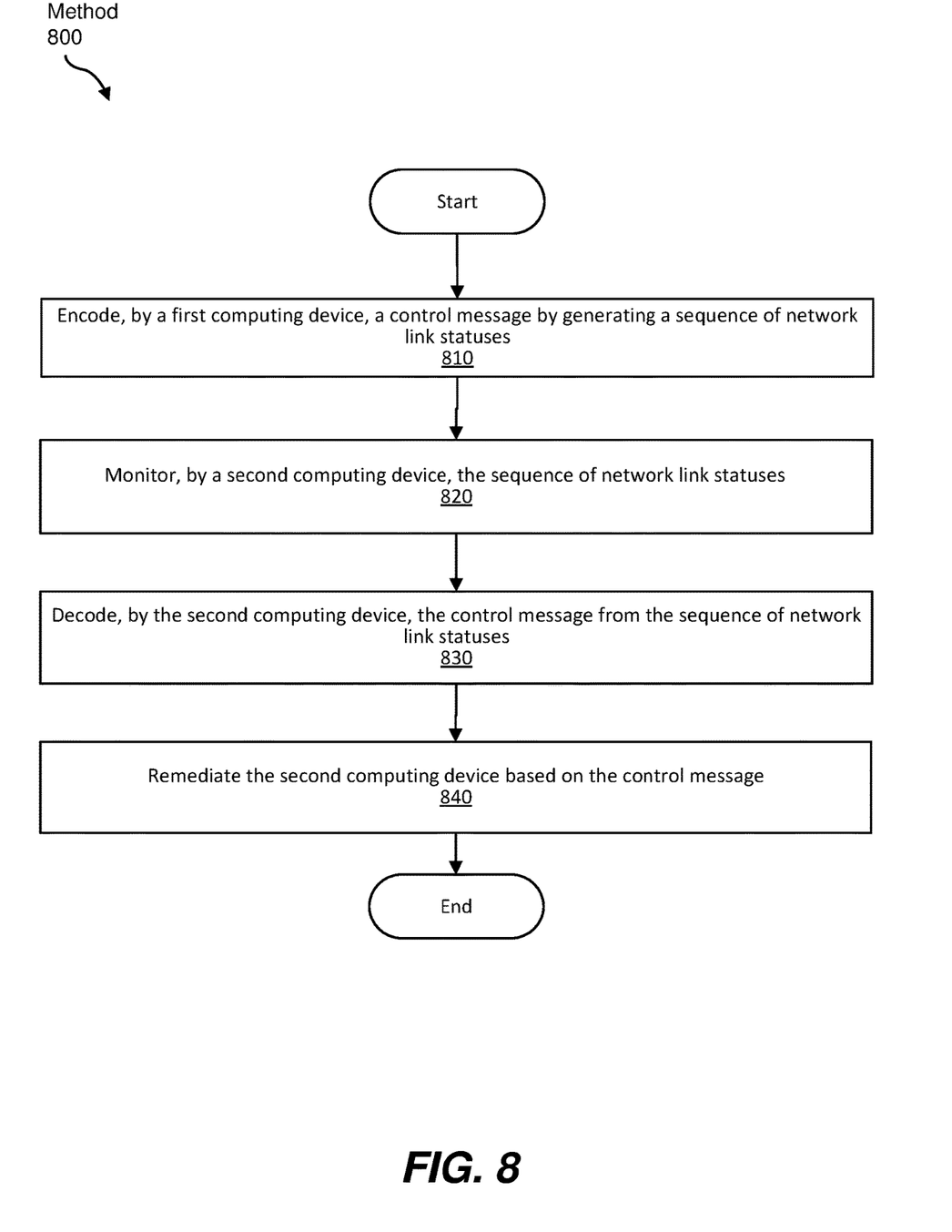
FIG. 8 is a flow diagram of an example method for link status detection and remediation of network attached devices.

FIG. 8 is a flow diagram of a method 800 for link status detection and remediation of network attached devices. As shown in FIG. 8, method 800 may include at step 810, encoding, by a first computing device, a control message by generating a sequence of network link statuses. At step 820, the method may include monitoring, by a second computing device, the sequence of network link statuses. At step 830, the method may include decoding, by the second computing device, the control message from the sequence of network link statuses. At step 840, the method may include remediating the second computing device based on the control message.

In some examples, implementing a remediation system for a network attached device using a remediation system controller as described above provides advantages over using solutions such as a baseboard management controller. Advantages of the embodiments of the present disclosure may include, without limitation, lower cost, smaller size, reduced power consumption, and lower complexity. Embodiments of the present disclosure may also increase the reliability of networked attached devices.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive signals to be transformed, transform the signals, output a result of the transformation to perform a control command function, and use the result of the transformation to perform a remediation function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
encoding, by a first computing device, a control message by generating a sequence of network link statuses;
monitoring, by a second computing device that is separate and remote from the first computing device, the sequence of network link statuses;
decoding, by the second computing device, the control message from the sequence of network link statuses; and
remediating the second computing device based on the control message.

2. The method of claim 1, wherein remediating the second computing device based on the control message comprises cycling power to at least a portion of the second computing device.

3. The method of claim 1, wherein remediating the second computing device based on the control message comprises rebooting a processor of the second computing device.

4. The method of claim 3, wherein rebooting the processor of the second computing device comprises booting the processor from at least one of an alternate basic input/output system (BIOS), an alternate non-volatile memory, or an alternate boot device.

5. The method of claim 1, wherein the decoding and remediation are performed by a deterministic finite state machine device.

6. The method of claim 1, wherein the first computing device comprises a network switch.

7. The method of claim 1, wherein the decoding and remediation are not performed by a general-purpose microprocessor executing computer-readable instructions.

8. The method of claim 1, wherein monitoring, by the second computing device, the sequence of network link statuses comprises monitoring a shared medium communication network protocol.

9. The method of claim 8, wherein the network protocol comprises an auto-negotiation protocol.

10. The method of claim 1, further comprising controlling a plurality of light emitting diodes with a signal pattern associated with the decoded control message.

11. The method of claim 10, further comprising:
monitoring the signal pattern controlling the plurality of light emitting diodes;
determining the signal pattern is associated with the decoded control message; and
remediating the second computing device based on the control message.

12. A system comprising one or more physical processors and one or more memories coupled to one or more of the physical processors, the one or more memories comprising instructions operable when executed by the one or more physical processors to cause the system to perform operations comprising:
encoding, by a first computing device, a control message by generating a sequence of network link statuses;
monitoring, by a second computing device that is separate and remote from the first computing device, the sequence of network link statuses;
decoding, by the second computing device, the control message from the sequence of network link statuses; and
remediating the second computing device based on the control message.

13. The system of claim 12, wherein remediating the second computing device based on the control message comprises cycling power to at least a portion of the second computing device.

14. The system of claim 12, wherein remediating the second computing device based on the control message comprises rebooting a processor of the second computing device.

15. The system of claim 14, wherein rebooting the processor of the second computing device comprises booting the processor from at least one of an alternate basic input/output system (BIOS), an alternate non-volatile memory, or an alternate boot device.

16. The method of claim 12, wherein the decoding and remediation are performed by a deterministic finite state machine device.

17. The system of claim 12, wherein the first computing device is a network switch.

18. The system of claim 12, wherein the decoding and remediation are not performed by a general-purpose microprocessor executing computer-readable instructions.

19. The system of claim 12, further comprising:
controlling a plurality of light emitting diodes with a signal pattern associated with the decoded control message;
monitoring the signal pattern controlling the plurality of light emitting diodes;
determining the signal pattern is associated with the decoded control message; and
remediating the second computing device based on the control message.

20. A computer-readable medium comprising:
computer-readable instructions that, when executed by at least one processor of a computing device, cause the computing device to:
encode, by a first computing device, a control message by generating a sequence of network link statuses;
monitor, by a second computing device that is separate and remote from the first computing device, the sequence of network link statuses;
decode, by the second computing device, the control message from the sequence of network link statuses; and
remediate the second computing device based on the control message.

* * * * *